United States Patent [19]

Loveless

[11] 3,925,511
[45] Dec. 9, 1975

[54] METALLATION OF POLYMERS AND SUBSEQUENT REACTION TO FORM MODIFIED OR GRAFTED POLYMERS

[75] Inventor: Frederick C. Loveless, Cheshire, Conn.

[73] Assignee: Uniroyal, Inc., New York, N.Y.

[22] Filed: Aug. 27, 1973

[21] Appl. No.: 391,903

[52] U.S. Cl. ............... 260/877; 260/47 R; 260/80.7; 260/80.78; 260/79.3 R; 260/83.3; 260/85.1; 260/85.3 R; 260/93.5 A; 260/94.7 A; 260/96 R; 260/878 R; 260/879; 260/880 R; 260/87
[51] Int. Cl. ...................... C08d 5/02; C08f 47/00
[58] Field of Search .......... 260/94.7 A, 877, 93.5 A, 260/47 UP, 880 R, 85.1, 80.7, 83.3, 85.3 R

[56] References Cited
UNITED STATES PATENTS

| | | | |
|---|---|---|---|
| 3,492,369 | 1/1970 | Naylor | 260/877 |
| 3,627,837 | 12/1971 | Webb | 260/877 |
| 3,634,548 | 1/1972 | Harwell et al. | 260/877 |
| 3,781,260 | 12/1973 | Halasa | 260/94.7 A |
| 3,781,262 | 12/1973 | Halasa et al. | 260/94.7 A |

*Primary Examiner*—Stanford M. Levin
*Attorney, Agent, or Firm*—James J. Long

[57] ABSTRACT

Polymers containing activated hydrogen atoms (e.g., polybutadiene) are metallated by reaction with (A) an organolithium compound (e.g., n-butyllithium) and (B) a soluble complex of a potassium or sodium alkylphenolate which is a reaction product of (I) an alkylphenol of the formula

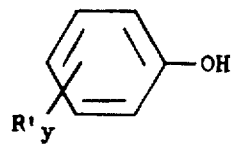

where R' is alkyl containing at least 8 carbon atoms and y is from 1 to 3, with (II) an alkali metal compound MOR" where R" is hydrogen or an aliphatic, cycloaliphatic or aromatic radical and M is potassium or sodium. An example is an alkane-soluble complex of the potassium salt (M = K) of p-nonyl phenol (R' = nonyl; y = 1) with water (R" = H) formed by reaction of (I) p-nonyl phenol with (II) potassium hydroxide in heptane (the water formed as a by-product in the reaction is retained as part of the soluble complex). The thus-metallated polymer may be reacted with a polymerizable compound (e.g., styrene) to form a graft copolymer useful in high impact compositions. Alternatively the metallated polymer may be reacted with a non-polymerizable compound to produce a chemically modified polymer (e.g., reaction with $CO_2$ produces a carboxylated polymer; reaction with ethylene oxide produces hydroxyethylated polymer).

19 Claims, No Drawings

METALLATION OF POLYMERS AND SUBSEQUENT REACTION TO FORM MODIFIED OR GRAFTED POLYMERS

This invention relates to a method of metallating a polymer and to a method of making a graft copolymer or chemically modified polymer, through the agency of the metallated polymer.

British Pat. No. 1,210,088, Oct. 28, 1970, Firestone, discloses the use of butyllithium and tertiary amines to metallate polymers followed by grafting. Unfortunately there are certain restrictions on the use of benzene as the solvent in such prior practice, whereas in the present invention excellent results are obtained in benzene.

British Pat. No. 1,254,220, Nov. 17, 1971, Firestone, discloses metallation of unsaturated polymer using an organolithium compound and a compound of an alkali metal other than lithium in which said other alkali metal is joined to an oxygen, sulfur, or nitrogen atom, e.g., potassium butoxide. Unfortunately, this insoluble metallating system leads to poor grafting efficiency and non-uniform product.

The present invention is based on the discovery that metallation of polymers can be accomplished in a highly advantageous manner by employing as the metallating reagent a combination of (A) an organolithium and (B) a soluble cocatalyst which is a complex of a potassium or sodium phenolate. The action of the catalyst is to produce negative centers spaced along the polymer spine which can serve as sites for a grafting reaction.

The organic lithium component (A) of the metallating catalyst is similar to the organic lithium compounds which have been used in the prior art. The formula is RLi, wherein R is a hydrocarbon radical selected from the group consisting of aliphatic, cycloaliphatic and aromatic radicals. The R in the formula preferably contains from 1 to 20 carbon atoms, although higher molecular weight compounds can be used. Examples of suitable organic lithium compounds include methyllithium, isopropyllithium, n-butyllithium, sec-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, and the like.

The other component (B) of the metallating catalyst is a soluble complex cocatalyst of a potassium or sodium alkylphenolate which is a reaction product of (I) a hydrocarbon-soluble alkylphenol having the formula

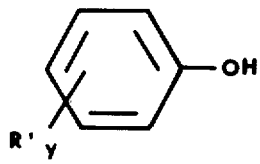

wherein R' is an alkyl group containing a minimum of 8 carbon atoms per group and a maximum of 26 carbon atoms in one or more such groups and y is an integer from 1 to 3, inclusive, with (II) an alkali metal compound MOR" where R" is selected from the group consisting of hydrogen and aliphatic, cycloaliphatic and aromatic hydrocarbon radicals and M is potassium or sodium. Such alkali metal containing soluble cocatalysts are formed by reacting (I) the hydrocarbon-soluble alkylphenol with (II) potassium or sodium hydroxide (or alkoxide or other compound of the formula MOR") to give a potassium or sodium alkylphenolate in the form of a complex with the reaction by-product. In the case where M is potassium, use of one mole of alkylphenol per mole of MOR" compound is sufficient to provide the soluble complex; in the case where M is sodium, an additional mole of the alkylphenol is used to insure solubility. The best way to prepare such soluble complexes is by reacting, e.g., potassium or sodium t-butoxide, or other MOR" compound, with the alkylphenol in, e.g., n-heptane and agitating, if desired, the reaction mixture under an inert atmosphere, e.g., nitrogen, for several hours at room temperature. Alkylphenols for use in making this alkali metal-containing catalyst component include octylphenol, nonylphenol and polyisobutylphenol. The polyisobutyl group in a commercial form of the latter compound contains, on the average, 26 carbon atoms.

Suitable alkali metal-containing reactants (MOR") are such potassium compounds as potassium hydroxide and potassium t-butoxide. Other suitable potassium containing reactants include the potassium derivatives of the following alcohols: ethanol, 3-propenol, propynol, 1-buten-3-ol, methylisopropylcarbinol, n-heptanol, triptanol, tri-t-butylcarbinol, 1-dodecanol, cyclopentanol, cyclohexanol, alpha-terpineol, phenylcarbinol, benzylcarbinol, styrylcarbinol, phenol, nonyl phenol and sym-xylenol. Corresponding compounds of sodium may also be used.

The molar ratio of (A) organolithium compound to (B) potassium or sodium phenolate complex in the metallation catalyst is frequently within the range of from 20:1 to 0.5:1, preferably 2:1 to 1:1. The catalyst is soluble in certain inert organic solvents, particularly the saturated aliphatic hydrocarbons (e.g., heptane) and benzene.

The polymers which are metallated in accordance with the invention are polymers having activated hydrogen atoms. In one aspect the invention is based on the discovery that treatment of polymers containing activated hydrogen atoms using the described combination of reagents results in removal of protons from the polymer with subsequent formation of metallated anions on the polymer backbone. Polymers containing activated hydrogen atoms may be defined as polymers having a

unit directly attached to an electron withdrawing group such as a double bonded carbon atom, an aromatic group, or a polar group such as $SO_2$, oxygen, sulfide, ammonium (especially $R_3''' N^+$— where $R'''$ is typically an alkyl group having 1 to 20 carbon atoms or an aryl group having 6 to 18 carbon atoms).

Examples of polymers containing activated hydrogen atoms, which act as spines for metallations in accordance with the invention, are the unsaturated polymers of di-olefins, especially conjugated diolefin polymers such as polybutadiene or polyisoprene (of any microstructure), polymers of vinyl aryl monomers such as polystyrene, copolymers of such monomers with each other or with other monomers as in SBR, NBR, butyl rubber, ethylene-propylene type rubbers, whether of the unsaturated type as in ethylene-propylene-non-conjugated diene terpolymers (wherein the diene may be exemplified by such materials as 1,4-hexadiene, dicyclopentadiene, 5-ethylidene-2-norbornene, etc.) or of a saturated type (containing benzylic hydrogens as in ethylene-propylenephenyl norbornene terpolymer), polyethers and polysulfones including polyphenyl ether, polyphenyl sulfone and polymers such as are described in U.S. Pat. No. 3,380,878, Wheeler, Apr. 30, 1968; also quaternized vinylpyridine, and the like.

The metallation is accomplished by contacting the polymer with the metallation catalyst in solution in an inert organic solvent, which may be a saturated aliphatic solvent or benzene.

The reaction time and temperature for the metallation are not critical and may vary widely, for example from ½ to 50 hours, preferably 1 to 30 hours, frequently about 18 hours, at from 0°C. to 100°C., preferably from 18°C to 60°C., frequently about 50°C.; ordinarily the time and temperature are roughly inversely related. Frequently the amount of organolithium compound (A) present is from 0.1 to 200 moles, preferably from 1.0 to 100 moles, per mole of polymer. The mixture is agitated during the metallation, which is frequently accompanied by the formation of a deep red color from the anions produced.

In accordance with one aspect of the invention, the polymer or spine metallated as described is amenable to further reaction, for example with polymerizable monomers to produce grafted products, or with small molecules (such as carbon dioxide, ethylene oxide) to produce chemically modified (e.g., carboxylated or hydroxyethylated) polymers.

To form a graft polymer, an anionically polymerizable monomer is added to the solution of metallated polymer (as is well understood by those skilled in the art, any monomer which has a group which has the capability of withdrawing electrons attached to an ethylenic double bond is anionically polymerizable). Thus, the monomers that may be added to the solution of metallated polymer include such well-known olefinically unsaturated polymerizable monomers as the di-olefins (e.g., butadiene, isoprene, piperylene), vinyl aryl compounds such as styrene, alpha-methylstyrene, etc., acrylic and methacrylic esters and nitriles (e.g., methyl methacrylate, acrylonitrile, methacrylonitrile) vinylpyridine and the like, epoxides (ethylene, propylene or styrene oxide), etc. Mixtures of monomers may be used.

Usually the monomer to be grafted on the backbone is injected into the reaction vessel containing the solution of metallated polymer. The solution becomes somewhat viscous and should be agitated vigorously. It is not necessary to heat the mixture, since grafting proceeds at ordinary ambient temperature (e.g., 21°C.), but if desired the mixture may be heated (e.g. to 50°–100°C.) to speed up the grafting. Depending on the temperature, grafting may be accomplished for example in 1 hour or less to 24 hours or more. The amount of monomer present in the grafting operation is not critical and may vary for example from 5% or less to 95% or more, based on the combined weight of the spine polymer plus monomer.

the resultant grafted polymer may be isolated by conventional methods, for example by pouring the solution into a precipitant (e.g., isopropanol). Generally the solution of grafted polymer in the reaction vessel is short-stopped with an antioxidant prior to precipitation or exposure to atmospheric conditions. The resultant product is typically all graft and contains little if any of the monomer.

The present process is remarkable for its ability to effect efficient metallation (with consequent high grafting efficiency) in benzene. This means that in the case of parent spines made in benzene, resolutioning in an aliphatic solvent is obviated. The method permits even polymers not soluble in alkanes, such as polystyrene, to be metallated, using benzene as the solvent. For example, polystyrene can be metallated, and then butadiene can be graft polymerized onto it.

By the method of the invention grafting efficiencies as high as 95% can be obtained, and the products are exceedingly uniform.

Useful high-impact plastics, or impact modifiers for addition to other resins to provide high impact plastics, may be made by grafting for example styrene, alpha-methyl styrene, acrylonitrile or methacrylonitrile onto polybutadiene (or SBR) or EPDM in accordance with the invention. The resulting graft copolymers include materials that are high impact plastics per se, or can be mixed with additional resin (e.g., styrene-acrylonitrile) to make high impact plastics.

As indicated, the metallated polymer can also be chemically modified in ways other than by graft polymerization. For example, reactive small molecules or non-polymerizable compounds may be combined with the metallated polymer to make highly useful modified polymer bearing various functional groups. Thus, an excess of a functionalizing agent such as carbon dioxide may be added to the solution of metallated polymer. Reaction is practically instantaneous, producing a reactive polymer bearing pendant carboxyl groups along the chain. The modified polymer may be recovered by standard flocculation procedure. Likewise, an alkylene oxide such as ethylene oxide may similarly be reacted with the metallated polymer to make hydroxyalkylated polymer. Since the alkylene oxide, in addition to being a reactive small molecule, is also a polymerizable monomer, it may be graft polymerized onto the metallated polymer to produce graft copolymers terminated by functional groups.

The following examples will serve to illustrate the practice of the invention in more detail.

EXAMPLE 1

To prepare ingredient (B) of the metallation catalyst, that is, the soluble cocatalyst complex, 42.5 g. (0.1 mole) of "polyisobutyl phenol 425" (commercial mixture of ortho and para bodies with an average molecular weight of 425; Rohm and Haas) is dissolved in dry, anaerobic n-heptane (to make 100 ml). Potassium hydroxide, 5.6 g. (0.1 mole), is added, forming the potassium salt of polyisobutyl phenol plus water as a by-product of the reaction. This by-product, water, serves as the solubilizing reagent, HOR" (where R" is in this case hydrogen). The mixture is shaken for several hours during which time the potassium salt of polyisobutyl phenol forms a complex with the by-product water and dissolves to give a clear solution.

The metallation vessel is a 500 ml. bottle, capped with a rubber gasket, a teflon sealer, and a metal cap with holes. The bottle contains 30 g. of polybutadiene (previously prepared in situ using 0.4 mmoles of butyl lithium as the polymerization catalyst) dissolved in 300 ml. of benzene, the solution being protected with nitrogen from moisture, oxygen, $CO_2$ etc. To this solution is injected, through a hole in the stopper, 0.4 mmoles of ethanol to inactivate live terminal lithium groups on the polybutadiene. Thereafter 0.1 mmole of the metallating cocatalyst ingredient (B) is injected (that is 0.1 mmole of the soluble complex of the potassium salt of polyisobutyl phenol and water), in the form of a solution in n-heptane prepared as described above. Also injected is 2.4 mmoles of n-butyl lighium [metallation catalyst ingredient (A)], dissolved in a little n-heptane to provide an Li/K ratio of 24/1. This reaction mixture is represented by Run a in Table I below. Three additional reaction mixtures, identified as b, c and d in Table I, differing only in the amounts of soluble complex of the potassium salt of polyisobutyl phenol employed, are also prepared. Run d, which contains no soluble complex of potassium polyisobutyl phenol, is outside the invention and is included merely for purposes of comparison. All four reaction mixtures are heated at 50°C. for 18 hours with shaking to produce metallated polybutadiene. Then 30 g. of styrene is added to each bottle. The styrene is allowed to graft polymerize for 18 hours at room temperature while agitating the bottles. The grafted reaction mixtures are then short-stopped with 5 ml. of a 5% solution of antioxidant (4,4'-thiobis-6-tert.-butyl-m-cresol) in methanol. The contents of the bottles are then poured into 500 ml methanol containing 1 g. of the antioxidant. Essentially quantitative yields are realized when the polymers are vacuum dried.

the extent of grafting of the homopolymer can be readily determined as follows: Dissolve one gram of the "graft" product in 50 ml. benzene. Add this solution slowly, with stirring, to 100 ml. of methyl ethyl ketone. This will result in a milky suspension in which the graft is only partially soluble and any polystyrene present will be still soluble. To this is added slowly enough acetone (usually about 100 ml.) to cause precipitation of the graft. The clear supernatant (containing polystyrene homopolymer) is decanted and the precipitate then washed several times with acetone. This technique does not require quantitative recovery of the graft and the polystyrene since the product is analyzed (by refractive index) for styrene content before and after reprecipitation. In this way, the true % of styrene in the graft can be readily calculated. In the present example (employing BuLi polymerized polybutadiene), the % styrene in the graft can be found by the following formula:

$$\% \text{ Styrene} = \frac{N_D^{30} \text{ of the "GRAFT"} - 1.5150}{.00076}$$

Once the % styrene in the graft is known, the weight of styrene which must have been grafted onto the 30 g. of polybutadiene can be calculated as follows:

| $X$ | % Styrene |
|---|---|
| $30 + X$ | 100 |

$X$ = wt. of styrene in graft

The grafting efficiency (and hence metallation efficiency), that is, the percentage of the originally added 30 g. of styrene which actually become grafted, is then simply:

$$100 \times \frac{X}{30}\%$$

Table I shows the styrene content of the graft in the four runs of this example, determined in the foregoing manner. The data in Table I show that even small amounts of soluble potassium complex (as in sample a) dramatically increase the grafting (metallation) efficiency. In sample d, where no soluble potassium complex is used, very little, if any, grafting is obtained. The conclusion here is that the more soluble potassium complex used in the range examined the more rapid and efficient is the metallation.

Table I

Metallation of Polybutadiene and Grafting of Styrene Using Potassium Polyisobutyl Phenolate-Water Complex

| Run | a | b | c | d |
|---|---|---|---|---|
| Soluble complex of K salt of polyisobutyl phenol with water (mmoles) | 0.1 | 0.5 | 1.0 | 0 |
| n-BuLi (mmoles) | 2.4 | 2.4 | 2.4 | 2.4 |
| Li/K ratio | 24/1 | 4.8/1 | 2.4/1 | — |
| % Styrene in graft | 15.5 | 32.2 | 47.2 | 1.6 |
| Grafting efficiency (%) | 18.5 | 47.3 | 89 | 3.2 |

EXAMPLE 2

This example demonstrates the effect of the duration of metallation on the extent of metallation as measured by grafting efficiency.

To prepare ingredient (B) of the metallation catalyst 22 g. (0.1 mole) of commercial nonyl phenol (mainly mono-p-nonyl phenol with some dinonyl and trinonyl phenol) is dissolved in dry, anaerobic n-heptane (to make 100 ml.) Potassium hydroxide, 5.6 g. (0.1 mole), is added and the mixture is shaken for several hours to form the soluble complex of the potassium salt of nonyl phenol and water.

To each of four bottles containing a solution of polybutadiene in benzene, prepared according to Example 1, is added 2.4 mmoles of BuLi (in heptane) and 1.2 mmoles of the soluble complex of the potassium salt of nonyl phenol with water (in heptane; Li/K ratio 2/1). The mixes are then heated at 50°C. for varying times as indicated in Table II. Styrene (30 g.) is then added to each bottle and allowed to polymerize for 18 hours at room temperature. The polymers are worked up as in Example 1, and the % styrene in the graft and grafting efficiency are calculated (50% styrene in the graft corresponds to 100% grafting efficiency), with the results shown in Table II. It is obvious from Table II that substantial metallation takes place even in 1 hour, but that after 24 hours the reaction has gone essentially to completion. There would be no benefit in metallating for longer periods at 50°C.

Table II

| Run | Effect of Duration of Metallation | | | |
|---|---|---|---|---|
|  | e | f | g | h |
| Duration of metallation, hrs. | 1 | 3 | 6 | 24 |
| % Styrene in graft | 36.2 | 41.2 | 43.5 | 48.5 |
| Grafting efficiency | 56.8 | 70 | 77 | 94.5 |

EXAMPLE 3

This example shows the preparation of a metallation catalyst using nonyl phenol and potassium t-butoxide. To prepare ingredient (B) of the metallation catalyst, that is, the soluble cocatalyst complex, 22 g. (0.1 m) of nonyl phenol and 11.6 g. (0.1 m) potassium t-butoxide are mixed to a total volume of 100 ml in dry benzene, forming potassium nonyl phenolate and t-butanol as a by-product. The potassium nonyl phenolate complexes with the by-product t-butanol, giving a 1 molar solution of the complex, which may be used, along with organolithium compound, in the metallation of polymer as in previous examples.

EXAMPLE 4

This example shows the effect on metallation of the overall level of metallating agent to determine if the grafting efficiency is altered depending on how many anions one is attempting to put on the spine. Metallation of polybutadiene (30 g. samples) is carried out as in Example 1 but with variations in the absolute level of metallating agent, as shown in Table III. Each sample is metallated 18 hours at 50°C., then 30 g. styrene is added to each bottle. The styrene is allowed to polymerize and the samples are worked up as in Example 1, and the % styrene in the graft and grafting efficiency are determined. The results are as shown in Table III. The conclusion here is that grafting efficiency is insensitive to the absolute level of metallating agent, all runs being equally good.

Table III

| Run | Effect of Level of Metallating Agent | | | | |
|---|---|---|---|---|---|
|  | j | k | l | m | n |
| Soluble complex of K salt of nonyl phenol with water (mmoles) | 0.4 | 0.8 | 1.2 | 2.4 | 4.0 |
| BuLi (mmoles) | 0.8 | 1.6 | 2.4 | 4.8 | 8.0 |
| % Styrene in graft | 43.8 | 44.1 | 44.5 | 44.5 | 44.5 |
| Grafting efficiency | 78.5 | 79 | 80.5 | 80.5 | 80.5 |

EXAMPLE 5

This example shows the use of a metallation cocatalyst which is a sodium salt of p-nonyl phenol complexed with p-nonyl phenol as the solubilizing agent (HOR″ where R″ is nonylphenyl). 44 g. (0.2 mole) of p-nonyl phenol is mixed with 4.0 g. (0.1 mole) of sodium hydroxide in enough heptane to bring volume to 100 ml. One equivalent of the nonyl phenol serves to neutralize the sodium hydroxide; the other equivalent serves as the solubilizing or complexing reagent HOR″. In this way a clear solution of the alkane soluble complex is formed in a short time. It is convenient, for example, to prepare a one molar (in sodium) solution this way so that it can be used directly in metallation. Three 30g. samples of polybutadiene are treated (in 300 ml. heptane) with the soluble complex and BuLi in varying levels as shown in Table IV. The ingredients are reacted on a shaker at 50°C. for 18 hours. Styrene is then added to the metallated polymer and allowed to polymerize for 1 day at room temperature. Then free polystyrene is extracted from the graft. The styrene content of the graft is determined by refractive index with the results shown in Table IV. From these data it can be concluded that grafting is, indeed, achieved. Grafting depends on Li/Na ratio (3/1 is best); however the grafting efficiencies are not as good as with the soluble potassium salt shown in previous examples.

Table IV

| Run | Metallation with Soluble Sodium Salt Complex | | |
|---|---|---|---|
|  | o | p | q |
| Soluble complex of Na salt of nonyl phenol (mmoles) | 2 | 2 | 2 |
| BuLi (mmoles) | 6 | 8 | 12 |
| Li/Na | 3/1 | 4/1 | 6/1 |
| Styrene | 13 | 13 | 13 |
| $N_D^{30}$ | 1.5306 | 1.5271 | 1.5210 |
| % Styrene (graft) | 20.6 | 16 | 7.9 |
| Grafting efficiency | 59.8 | 44 | 19.6 |

EXAMPLE 6

This example compares directly metallation with insoluble potassium t-butoxide (disclosed in British Pat. No. 1,254,220) with a soluble complex of potassium nonyl phenolate with n-butyl alcohol as in the present invention. The materials are compared at different Li/K ratios to establish their relative metallating efficiencies. The insoluble potassium t-butoxide is designated "Insoluble Salt" in Table V, while the complex (made by reacting nonyl phenol with potassium t-butoxide as in Example 3) is designated "Soluble Complex". Solutions of 30 g. of polybutadiene in 300 ml. of benzene are treated with a mixture of either the insoluble salt or the soluble complex and n-butyl lithium in amounts shown in Table V at 50°C. for 18 hours. Styrene (13 g.) is then added to form graft as in previous examples. Free polystyrene is extracted away; the % styrene in the graft and the grafting efficiencies are determined with the results shown in Table V.

Table V

| Run | Comparison of Soluble and Insoluble Metallation Salts | | | | | | | |
|---|---|---|---|---|---|---|---|---|
|  | r | s | t | u | v | w | x | y |
| Insoluble Salt, mm | 0.4 | 1.0 | 2.0 | 4.0 | — | — | — | — |
| Soluble Complex, mm | — | — | — | — | 0.4 | 1.0 | 2.0 | 4.0 |
| BuLi, mm | 2.0 | 2.0 | 2.0 | 2.0 | 2.4 | 3.0 | 4.0 | 6.0 |

Table V-continued

| | Comparison of Soluble and Insoluble Metallation Salts | | | | | | | |
|---|---|---|---|---|---|---|---|---|
| Run | r | s | t | u | v | w | x | y |
| Li/K % Styrene in Graft | 5/1 | 2/1 | 1/1 | 1/2 | 6/1 | 3/1 | 2/1 | 1.5/1 |
| Grafting Efficiency | 6.6 | 21 | 21.8 | 9.6 | 5.3 | 18.5 | 26 | 30 |
| | 16.3 | 61 | 24.5 | 13 | 52 | 81 | 100 | |

Not readily visible from the data is the fact that metallated polymers prepared with the present soluble complex remain much more fluid and permit easier mixing in of the monomer to be grafted. Although this phenomena can not be readily explained at this time it is of great practical importance. Furthermore, the polymer graft prepared from the soluble complex is more uniform in its composition.

I claim:

1. A method of metallating a polymer having activated hydrogen atoms which is a polymer of a conjugated diene comprising contacting a solution of said polymer in an inert liquid hydrocarbon solvent, selected from the group consisting of a saturated aliphatic solvent and benzene with
    A. an organolithium compound having the formula RLi wherein R is a hydrocarbon radical selected from the group consisting of aliphatic, cycloaliphatic and aromatic radicals and
    B. a hydrocarbon-soluble cocatalyst complex of a potassium or sodium alkylphenolate which is a reaction product of (I) a hydrocarbon-soluble alkylphenol of the formula

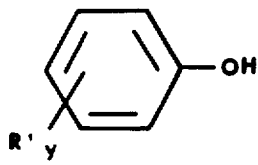

wherein R' is an alkyl group containing a minimum of 8 carbon atoms per group and a maximum of 26 carbon atoms in one or more such groups and y is an integer from 1 to 3, inclusive, with (II) an alkali metal compound MOR'' where R'' is selected from the group consisting of hydrogen and aliphatic, cycloaliphatic and aromatic hydrocarbon radicals and M is potassium or sodium, the said hydrocarbon-soluble cocatalyst complex having been formed by bringing the said reactants (I) and (II) together under an inert atmosphere in an inert liquid hydrocarbon solvent, with agitation, in amount of 1 mole of alkylphenol (I) per mole of alkali metal compound (II) when M is potassium and in amount of 2 moles of alkylphenol (I) per mole of alkali metal compound (II) when M is sodium, to form a hydrocarbon-soluble complex of alkali metal alkylphenolate and by-product of the reaction of (I) with (II), the molar ratio of (A) organolithium compound to (B) potassium or sodium alkylphenolate complex being from 20:1 to 0.5:1, the said metallation being carried out at a temperature of from 0°C to 100°C for a period of time 1 to 30 hours, the amount of organolithium compound (A) present during the metallation being from 0.1 to 200 moles per mole of polymer, the mixture being agitated during the metallation.

2. A method as in claim 1 where the said polymer is polybutadiene.
3. a method as in claim 1 wherein the inert hydrocarbon solvent is a saturated aliphatic solvent.
4. A method as in claim 1 wherein the inert hydrocarbon solvent is benzene.
5. A method as in claim 1 wherein the inert hydrocarbon solvent is n-heptane.
6. A method as in claim 1 wherein the organolithium compound is an alkyllithium.
7. A method as in claim 1 wherein the organolithium compound is n-butyllithium.
8. A method as in claim 1 wherein M is potassium.
9. A method as in claim 1 where M is sodium.
10. A method as in claim 1 wherein y is one and R' is located in the para position.
11. A method as in claim 1 wherein (B) is potassium p-polyisobutyl phenolate-water complex.
12. A method as in claim 1 wherien (B) is potassium p-nonyl phenolate-water complex.
13. A method as in claim 1 wherein (B) is a complex of sodium p-nonyl phenolate and nonyl phenol.
14. A method as in claim 1 wherein (B) is a complex of potassium p-nonyl phenolate and t-butanol.
15. A method as in claim 1 wherein the molar ratio of (A) to (B) is within the range of from 2:1 to 1:1.
16. A method as in claim 1 wherein the said polymer is contacted with (A) and (B) for 1 to 30 hours at a temperature of from 18°C. to 60°C.
17. A method as in claim 1 wherein the amount of (A) is from 1.0 to 100 moles per mole of polymer.
18. A method as in claim 1 wherein, subsequent to said metallation, there is added to the resulting solution of metallated polymer an anionically polymerizable monomer whereby a graft copolymer of said polymerizable monomer with said metallated polymer is formed.
19. A method as in claim 18 wherein said added monomer is styrene.

* * * * *